United States Patent Office 3,435,627
Patented Apr. 1, 1969

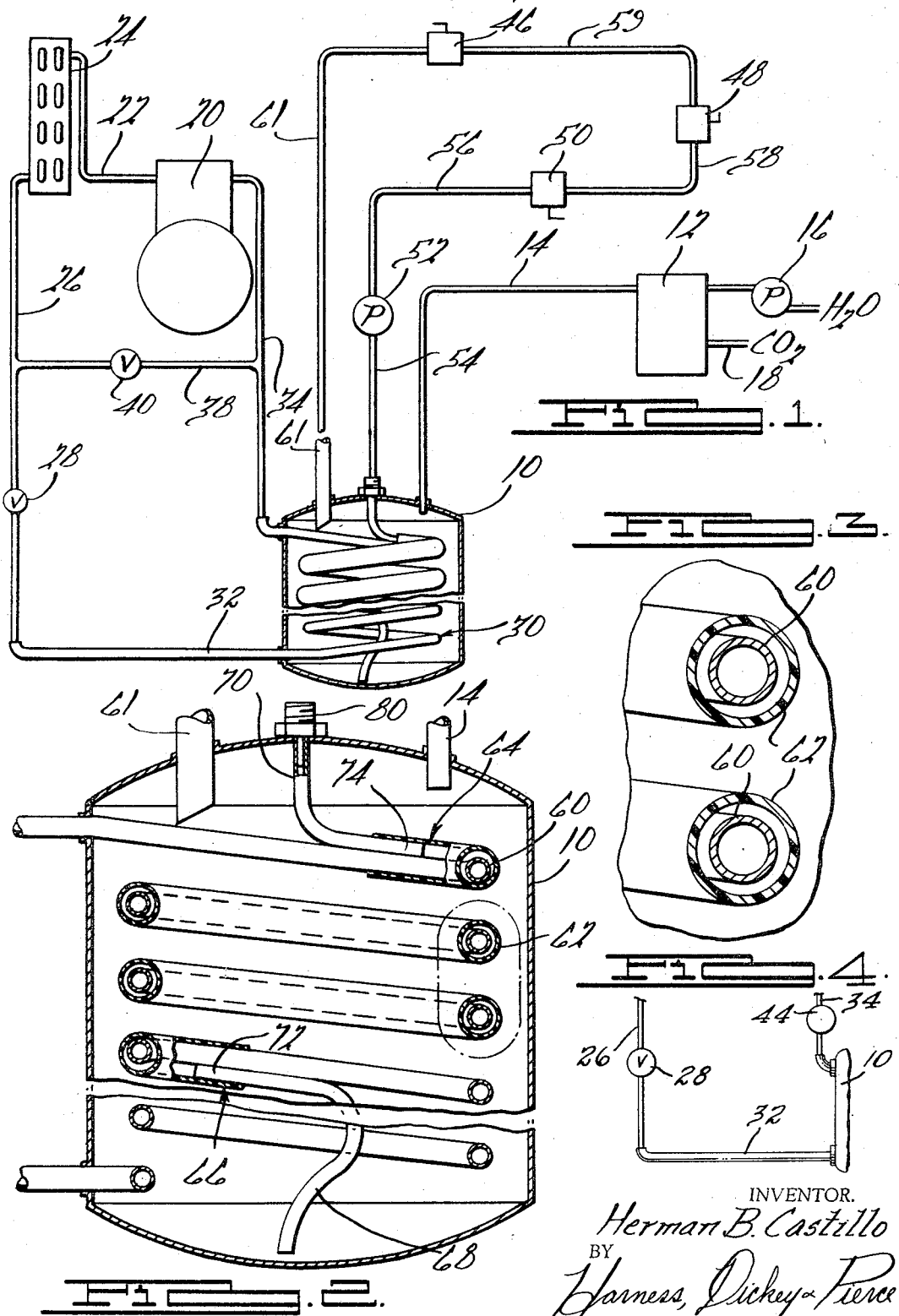

3,435,627
HEAT EXCHANGE SYSTEM
Herman B. Castillo, Clawson, Mich., assignor to Temprite Products Corporation, Troy, Mich., a corporation of Michigan
Filed Dec. 28, 1966, Ser. No. 605,388
Int. Cl. B67d 5/62; F28f 1/00
U.S. Cl. 62—197       3 Claims

ABSTRACT OF THE DISCLOSURE

The present disclosure relates to a heat exchange system particularly adapted for the cooling of a recirculating liquid, wherein a portion of the circulating liquid conduit is disposed in a generally coaxial relationship with several of the turns of a refrigeration evaporator coil, other turns of which are immersed in a body of the liquid being cooled.

Summary background of the invention

This invention relates to a heat transfer means and more particularly to heat transfer means which may be used in conjunction with a refrigerated liquid coolant cooler. The invention also relates to a method of fabricating the heat transfer means mentioned above.

The invention is particularly useful in a liquid dispensing device that may dispense a beverage to a plurality of different outlet faucets. In this type of system, a liquid cooler is provided having a container that is adapted to be filled with the fluid to be dispensed. Refrigerating coils that form the evaporator of a recirculating type refrigerating system are positioned within the cooler to lower the temperature of the liquid to be dispensed to a desired level.

In the present invention, a liquid outlet line from the container containing the liquid to be dispensed is positioned in coaxial arrangement with a portion of the refrigerating coil that cools this liquid. In the preferred embodiment of the invention, this outlet line is constructed of a plastic material, such as, polyethylene tubing, which is positioned coaxially about a portion of the refrigerating coil and is of larger diameter than this coil thereby providing a conduit for the liquid to be dispensed which is poistioned in coaxial relationship to the refrigerating coils. This provides a very efficient heat transfer system which will cool the liquid flowing therethrough to a desired low temperature in a very economical and efficient way. As the liquid flows through this conduit, an increase in velocity of the liquid is provided and a very low temperature of the liquid at dispensing faucets may be obtained without freezing. This temperature is lower than would otherwise be obtainable if an attempt is made to lower the temperature by the mere addition of more refrigerant coils in the container that is filled with the liquid to be dispensed.

In the refrigerating system that employs the refrigerating coils positioned in the liquid dispenser, it is important that the pressure in the refrigerating coils or evaporator not fall below a predetermined minimum in order to maintain the temperature in the container above the freezing point of the liquid to be dispensed. This may be accomplished by providing a hot gas bypass valve in a bypass line that intercouples the inlet line to the compressor of the system with the outlet line from the condenser of the system or, stated alternatively, this bypass line with the hot gas bypass valve is positioned across the evaporator or the refrigerating coils of the system. When the pressure in the outlet line from the evaporator or the inlet line to the compressor falls to a predetermined minimum, the hot gas bypass valve will open by sensing the pressure in this line thereby shunting refrigerating liquid around the evaporator and maintaining the pressure in the inlet line to the compressor or the outlet line from the evaporator above the predetermined minimum which will prevent freezeup of the liquid contained in the liquid dispensing container.

The function of preventing the pressure at the outlet of the evaporator from falling below a predetermined minimum may also be accomplished by placing an evaporator pressure regulator in the outlet line of the evaporator or the refrigerating coils that are positioned within the liquid dispensing container. This evaporator pressure regulator will prevent the pressure from the outlet of the evaporator from falling below a predetermined minimum which would in turn provide temperatures that would freeze the liquid contained in the evaporator.

The present invention may be used with any type of recirculating refrigerating system that will circulate a refrigerant medium through the coils of an evaporator. Furthermore, the dispenisng system used with the invention may be of either the recirculating type or the noncirculating type but as disclosed in the drawing and in the description of the invention, it is employed with a recirculating type dispensing system.

An object of the invention is the provision of an efficient heat transfer system that may be employed in a liquid dispensing system for dispensing liquid from a container at one or more spaced locations.

Another object of the invention is the provision of an efficient heat transfer means that will permit lowering of the temperature of a liquid to be dispensed to a very desirable low temperature without danger of causing freezing of the liquid in a liquid container.

A further object of the invention is the provision of an efficient heat transfer means for a liquid to be dispensed in which a liquid in a dispensing tube comes into direct contact with a refrigerating coil as the liquid is dispensed.

Still another object of the invention is the provision, in a liquid dispensing system having a refrigerating coil positioned therein, of means for permitting the liquid as it is dispensed to come into direct contact with the refrigerating coils at a velocity which will provide maximum cooling without freezing of the liquid.

Still a further object of the invention is the provision of a method of fabricating a heat exchanger in which a plastic tube is threaded over the coils of the heat transfer means that contains the refrigerating medium.

Other objects and attendant advantages of the present invention may be more readily realized as the specification is considered in connection with the attached drawings, in which:

FIGURE 1 is a schematic diagram of the heat transfer system of the present invention employed with a recirculating type liquid dispensing system;

FIG. 2 is an enlarged sectional view of the container adapted to contain the liquid to be dispensed;

FIG. 3 is an enlarged sectional view taken in the area of the dotted lines of FIG. 2 and showing the positioning of a coaxial outlet line from the container positioned over the refrigerant coils in the container; and FIGURE 4 is a schematic diagram of a portion of the system of FIGURE 1, showing a modification thereof.

Referring now to the drawings in which like reference numerals designate like parts throughout the several views thereof, there is shown in FIG. 1 the liquid dispensing system of the present invention which includes a container 10 that is adapted to receive a liquid to be dispensed. The container 10 may be filled with carbonated water which is received from a carbonator 12 through an inlet line 14. The carbonator 12 may be connected to a suitable source of water through a pump 16 and may have carbon dioxide mixed with this water through a pressurized container of carbon dioxide having an inlet line 18 to the carbonator 12. In the alternative, the liquid to be dispensed may be carbonated directly in the container 10.

A refrigerating system adapted to cool the liquid contained in the liquid dispensing container 10 comprises a compressor 20 that is adapted to compress the refrigerant contained in the refrigerating system and deliver it through an outlet line 22 under a predetermined pressure to a condenser 24. The condenser cools the refrigerant and then delivers it through an outlet line 26 to a throttling device, i.e., either an expansion valve or capillary restrictor 28 where it undergoes expansion and is then delivered to an evaporator 30 through an inlet line or conduit 32. This reduction in pressure of the refrigerant, of course, lowers the temperature of the refrigerant to a desired level. This refrigerant under low pressure then flows through the coils in the evaporator and is returned to the inlet of the compressor 20 through a line or conduit 34.

A bypass conduit 38 having a hot gas bypass valve 40 positioned therein is connected across the evaporator 30 or between the conduits 26 and 34. This hot gas bypass valve senses the pressure in the line 34 and when it has fallen to a predetermined minimum, the hot gas bypass valve opens thereby supplying refrigerant under pressure to the conduit 34 thus preventing the pressure in the line 34 from falling below a predetermined minimum. The predetermined minimum pressure that is maintained in the line 34 as a result of this hot gas bypass valve is correlated to the temperature to be maintained in the liquid contained in container 10 and this minimum pressure is selected to cool this liquid to a point near its freezing level, but sufficiently above it to prevent the freezing of the liquid in the container 10.

The function of preventing the pressure in the outlet of the evaporator from falling below a predetermined minimum may also be accomplished by placing an evaporator pressure regulator 44 in the outlet line 34 of the evaporator, such as shown in FIGURE 4. The pressure at which the evaporator pressure regulator 44 will open is correlated to the temperature to be maintained in the liquid contained in container 10 and it is selected, as in the case of the hot gas bypass valve, to cool the liquid to a point near its freezing level but sufficiently above it to prevent the freezing of the liquid in the container 10. This evaporator pressure regulator may be employed as an alternative to the bypass line 38 and hot gas bypass valve 40, which, of course, would be eliminated in this embodiment of the invention.

The liquid to be dispensed that is contained in the container 10 may be dispensed to a plurality of faucets 46, 48 and 50 located at different positions in a bar or other type of liquid dispensing stations that use the carbonated water contained in the container 10 for the mixing of various types of soft drinks. This recirculating system comprises a pump 52 that pumps the liquid from the container 10 via an outlet pipe 54 from the container which serves as an inlet conduit to the pump 52, an outlet conduit 56 from the pump 52, interconnecting conduits 58 and 59 that interconnect the faucets 46, 48 and 50 and a return line or conduit 61 that returns any unused portion of the liquid to be dispensed to the container 10.

The heat transfer system or device positioned in the container 10 comprises the evaporator 30 of the recirculating refrigerating system that is in the form of a plurality of metallic coils 60. These coils are positioned to form a generally cylindrical refrigerating device within the container that extends from the conduit 32 which is the inlet line of the evaporator to the conduit 34 which serves as the outlet line for the evaporator. A coaxial dispensing tube 62 is positioned over a portion of the coils 60 that form the evaporator 30 in the liquid dispensing container 10. As shown in the drawings and as is preferred, this liquid dispensing tube 62 is comprised of a plastic material, such as polyethylene, and this tube may be threaded over the upper portion of the coils 60, of the evaporator 30. This tubing 62 may be threaded over the coils 60 prior to the assembly of the container 10 and connections 64 and 66 are formed at the open ends thereof. These connections provide a means for connecting an inlet conduit 68 to the lower portion of the tubing 62 and an outlet conduit 70 to the upper portion of the inlet tube 62. They are formed by merely forcing the ends 72 and 74 of these two lines, respectively, which are of smaller diameter than the tubing 62, into the ends of the plastic tubing 62 and sealing them within these connections by means of any suitable adhesive. These conduits 68 and 70 are preferably formed of a polyethylene material similar to the tubing 62.

It can be appreciated that any number of refrigerating coils 60 may be employed, as implied by the broken line in FIG. 2. Similarly, a selected fraction of them may be covered by the plastic tubing 62. It should be realized, of course, that the coils 60 that are not covered by the plastic tubing 62 provide a means for lowering the temperature of a liquid contained in the liquid container 10 to a desired low level and that as the liquid is dispensed through the space provided between the coils 60 and the plastic tubing 62, the temperature of the liquid to be dispensed is lowered several degrees and may in fact be lowered to a point very near the freezing point of the liquid. If, for example, carbonated water is to be dispensed from the container 10, its temperature may be lowered by the exposed coils 60 of the evaporator 30 to approximately 37°. The temperature of the carbonated water may then be lowered to approximately 33° as it flows through the space between the coils 60 and the plastic tubing 62.

As the pump 52 operates to pump fluid to be dispensed from the container 10, it will create a vacuum in the line 54, thereby forcing liquid to be dispensed through the inlet line 68 of the plastic tubing 62 positioned at the bottom of the container 10 then through the space positioned between the coils 60 of the evaporator 30 and the plastic tubing 62, thereby providing intimate heat exchange relationship between the liquid flowing in the space provided between the coils 60 and the plastic tubing 62. This action further cools the liquid being dispensed to a temperature below that which it has already been cooled by exposure to the portion of the refrigerating coils 60 that is not covered by the tubing 62. The liquid will then exit through the connection 64 and the end 74 of the line 70 to the connection 80 positioned at the top of the fluid container 10. Fluid will then flow to the pump 52 through the inlet line 54 and then will be circulated through the conduits 56, 58 and 59 to the dispensing faucets 50, 48 and 46. Thereafter, the unused portion will be returned to the container 10 through the conduit 61.

Drawing the liquid to be dispensed between the space defined by the coils 60 and the tubing 62 provides a means for lowering the temperature of the liquid at the faucets 46, 48 and 50 near its freezing point without danger of freezing the liquid, since this small space provides a relatively high velocity for the liquid as it is cooled and dispensed. It can be appreciated that the heat exchange system of the present invention is efficient, inexpensive and uncomplicated and provides means for lowering the temperature of the liquid to be dispensed at the dispensing faucets below that which would ordinarily be obtainable without much more expensive structures. For example, if the temperature of the refrigerant in the refrigerating coil 60 were lowered to a low level to cool all the liquid in the container 10 near its freezing point, some means would need to be employed to prevent freezing of this liquid that is adjacent the coils, such as, agitation or the use of two tanks with a set of coils in each in which the liquid would flow from one tank to the other as the liquid is dispensed. These alternative means for preventing freezing of the liquid are much more complex and expensive than the structure of the present invention.

Although it is not essential that plastic tubing, such as polyethylene, be used for the plastic tubing 62, it is very desirable since it may be easily positioned over coil 60 of the evaporator 30 and will retain its flexibility and strength when cold.

It can be appreciated, therefore, that the present invention provides a heat transfer system for refrigerating a liquid to be dispensed to a temperature near its freezing point that is both efficient and economical.

While the forms of the invention described above constituted a preferred embodiment of the invention, it is to be understood that the invention is not limited to these precise forms and that changes may be made therein without departing from the scope of the invention as defined in the appended claims.

What is claimed is:

1. A system adapted to dispense a refrigerated liquid comprising: a container adapted to contain a liquid to be dispensed; a refrigerating system evaporator including a coiled tube positioned in said container and adapted to receive a circulating refrigerant medium, said coiled tube having a plurality of turns; a liquid conducting tube positioned in a generally coaxial relation to said coiled tube over one portion only of the turns of said coiled tube, the remaining turns being positioned below the normal level of the liquid in said container, said liquid conducting tube being constructed of a relatively flexible plastic material and having a larger diameter than the diameter of said coiled tube; liquid inlet means adjacent one end of said liquid conducting tube through which liquid in said container may flow into said liquid conducting tube and liquid outlet means adjacent the other end of said liquid conducting tube extending to the outside of said container, whereby when liquid is removed from said container through said liquid conducting tube it will be brought into close proximity to the circulating refrigerant medium in said coiled tube, said liquid inlet means and said liquid outlet means each comprising a conduit of lesser diameter than the inner diameter of said liquid conducting tube, said conduits each having one end inserted into the space between said liquid conducting tube and said coiled tube; means sealing and connecting said ends of said conduit with said liquid conducting tube; means for dispensing the cooled liquid; means for conducting the cooled liquid in a closed path from said liquid outlet means to said dispensing means and back to said liquid inlet means; pump means for recirculating the liquid along said path; and control means connected to said evaporator to prevent the refrigerant pressure therein from falling below a predetermined minimum.

2. The combination of claim 1 in which said control means comprises a pressure regulator connected to the outlet of said evaporator.

3. The combination of claim 1 in which said control means comprises a bypass conduit connected across said evaporator, and a hot gas bypass valve positioned therein.

References Cited

UNITED STATES PATENTS

| 2,075,184 | 3/1937 | Dolison | 62—394 |
| 2,278,225 | 3/1942 | Taylor | 62—394 |
| 2,278,226 | 3/1942 | Taylor | 62—394 |
| 2,762,209 | 9/1956 | Bennett | 62—394 XR |

MEYER PERLIN, *Primary Examiner.*

U.S. Cl. X.R.

62—217, 394